US012593746B2

(12) United States Patent
Bagwan et al.

(10) Patent No.: US 12,593,746 B2
(45) Date of Patent: Apr. 7, 2026

(54) ROTARY MOWER BLADE POSITION SYNCHRONIZATION SYSTEM

(71) Applicant: DEERE & COMPANY, Moline, IL (US)

(72) Inventors: Rajesaheb A. Bagwan, Buapur (IN); Sourabha S. Gokhale, Ichalkaranji (IN); Amit S. Chavan, Pune (IN); Dietmar K. Steinhoff, Gummersbach (DE); Swagat Sinha, Baripada (IN)

(73) Assignee: DEERE & COMPANY, Moline, IL (US)

( * ) Notice: Subject to any disclaimer, the term of this patent is extended or adjusted under 35 U.S.C. 154(b) by 769 days.

(21) Appl. No.: 17/930,549

(22) Filed: Sep. 8, 2022

(65) Prior Publication Data

US 2024/0081174 A1     Mar. 14, 2024

(51) Int. Cl.
| | |
|---|---|
| *A01D 34/78* | (2006.01) |
| *A01D 34/00* | (2006.01) |
| *A01D 34/66* | (2006.01) |
| *A01D 101/00* | (2006.01) |

(52) U.S. Cl.
CPC ........... *A01D 34/006* (2013.01); *A01D 34/78* (2013.01); *A01D 34/66* (2013.01); *A01D 2101/00* (2013.01)

(58) Field of Classification Search
CPC ...... A01D 34/006; A01D 34/78; A01D 34/66; A01D 2101/00
See application file for complete search history.

(56) References Cited

U.S. PATENT DOCUMENTS

| | | | |
|---|---|---|---|
| 4,707,971 A | * | 11/1987 | Forpahl ................ A01D 34/866 180/41 |
| 4,856,265 A | | 8/1989 | Wolf |
| 6,591,593 B1 | * | 7/2003 | Brandon ................ A01D 69/02 56/10.8 |
| 7,313,902 B1 | | 1/2008 | Eavenson, Sr. et al. |
| 7,525,269 B2 | | 4/2009 | Patel et al. |
| 7,797,915 B1 | | 9/2010 | Kallara et al. |
| 8,042,322 B1 | | 10/2011 | Wyatt |
| 8,234,026 B2 | | 7/2012 | Wyatt et al. |
| 8,539,745 B2 | | 9/2013 | Schmidt et al. |
| 8,701,377 B1 | | 4/2014 | Wadzinski et al. |
| 8,965,630 B2 | | 2/2015 | Wyatt et al. |
| 9,125,341 B2 | | 9/2015 | Ebihara et al. |
| 9,173,346 B2 | | 11/2015 | Koike et al. |
| 9,708,927 B2 | | 7/2017 | Hatcher, Jr. et al. |
| 2012/0227368 A1 | * | 9/2012 | Koike .................... A01D 69/02 56/10.2 A |

(Continued)

FOREIGN PATENT DOCUMENTS

| | | | |
|---|---|---|---|
| EP | 0856245 B1 | 7/2003 | |

*Primary Examiner* — Claude J Brown

(57) ABSTRACT

A rotary mower blade position synchronization system with first and second rotary mower blades rotated by electric motors. First and second position sensors provide electric motor position signals to first and second control inverters. The control inverters communicate to run a calibrate routine to set the angle of the first rotary mower blade relative to the second rotary mower blade, and a synchronous operation mode to operate the first and second electric motors at rotational speeds that maintain the position of the first rotary mower blade relative to the second rotary mower blade when mowing.

12 Claims, 6 Drawing Sheets

(56) References Cited

U.S. PATENT DOCUMENTS

| | | | |
|---|---|---|---|
| 2012/0296593 A1 | 11/2012 | Seccombe | |
| 2014/0116017 A1* | 5/2014 | Hunt | A01D 34/006 |
| | | | 56/10.2 R |
| 2015/0214864 A1 | 7/2015 | Sopko | |
| 2015/0357949 A1* | 12/2015 | Marlia | G05B 19/4061 |
| | | | 318/490 |
| 2018/0160622 A1 | 6/2018 | Pellenc | |
| 2018/0192580 A1* | 7/2018 | Zeiler | A01D 34/78 |
| 2019/0111789 A1* | 4/2019 | Matsuda | B60T 1/005 |
| 2020/0260639 A1* | 8/2020 | Walker | A01D 34/74 |
| 2020/0260642 A1* | 8/2020 | Desai | A01D 34/54 |
| 2020/0288632 A1* | 9/2020 | Desai | A01D 34/6806 |
| 2020/0337231 A1* | 10/2020 | Kelly | A01D 34/005 |
| 2020/0352094 A1* | 11/2020 | Desai | A01D 42/005 |

* cited by examiner

100

101

Master Controller or
Vehicle controller

CAN Communication

102

103

Control

Control

104

105

Motor + Sensor 1

Motor + Sensor 2

106

107

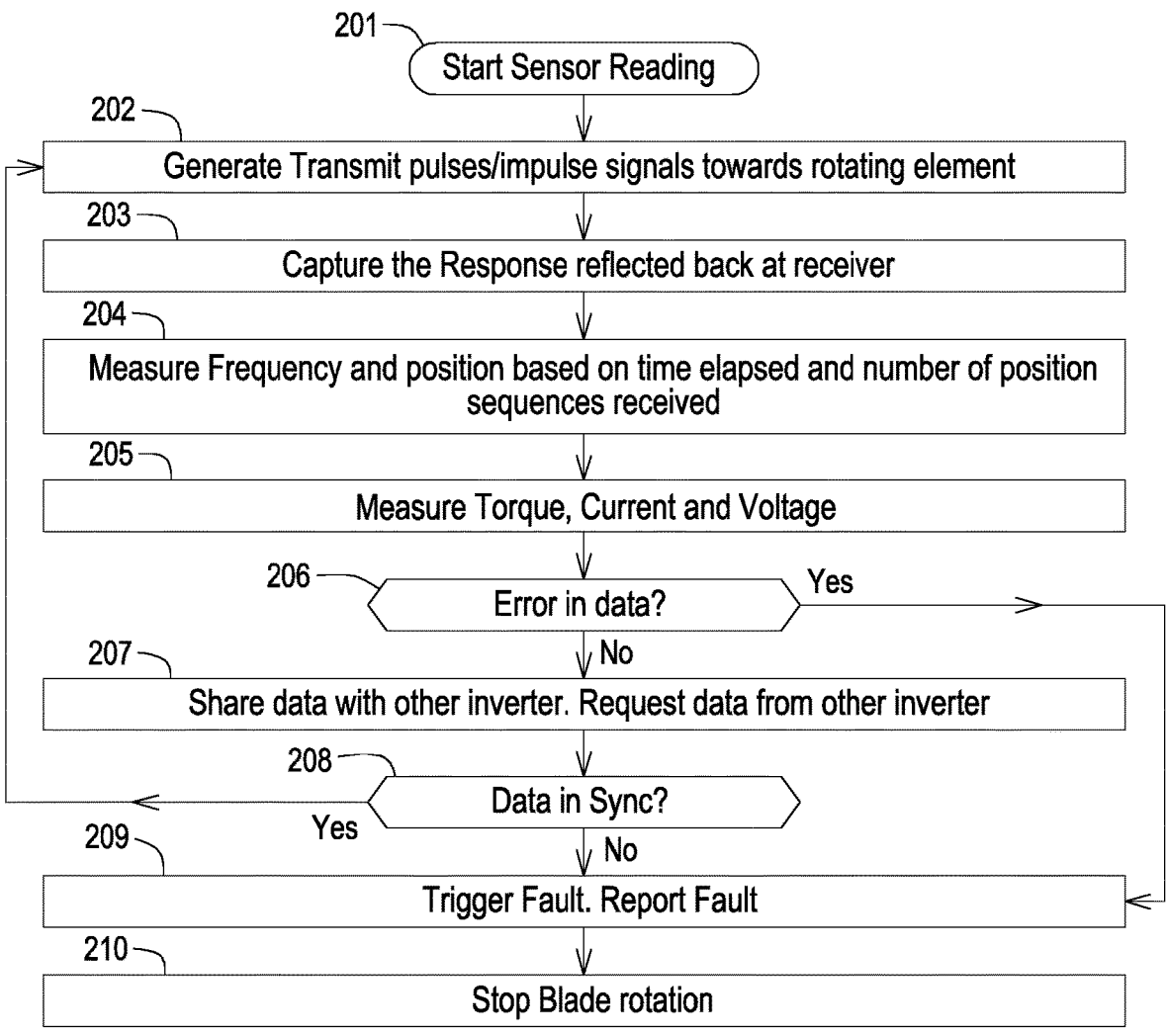

201 — Start Sensor Reading

202 — Generate Transmit pulses/impulse signals towards rotating element

203 — Capture the Response reflected back at receiver

204 — Measure Frequency and position based on time elapsed and number of position sequences received 205 — Measure Torque, Current and Voltage 206 — Error in data?    Yes No 207 — Share data with other inverter. Request data from other inverter 208 — Data in Sync?

Yes    No

209 — Trigger Fault. Report Fault

210 — Stop Blade rotation

FIG. 2

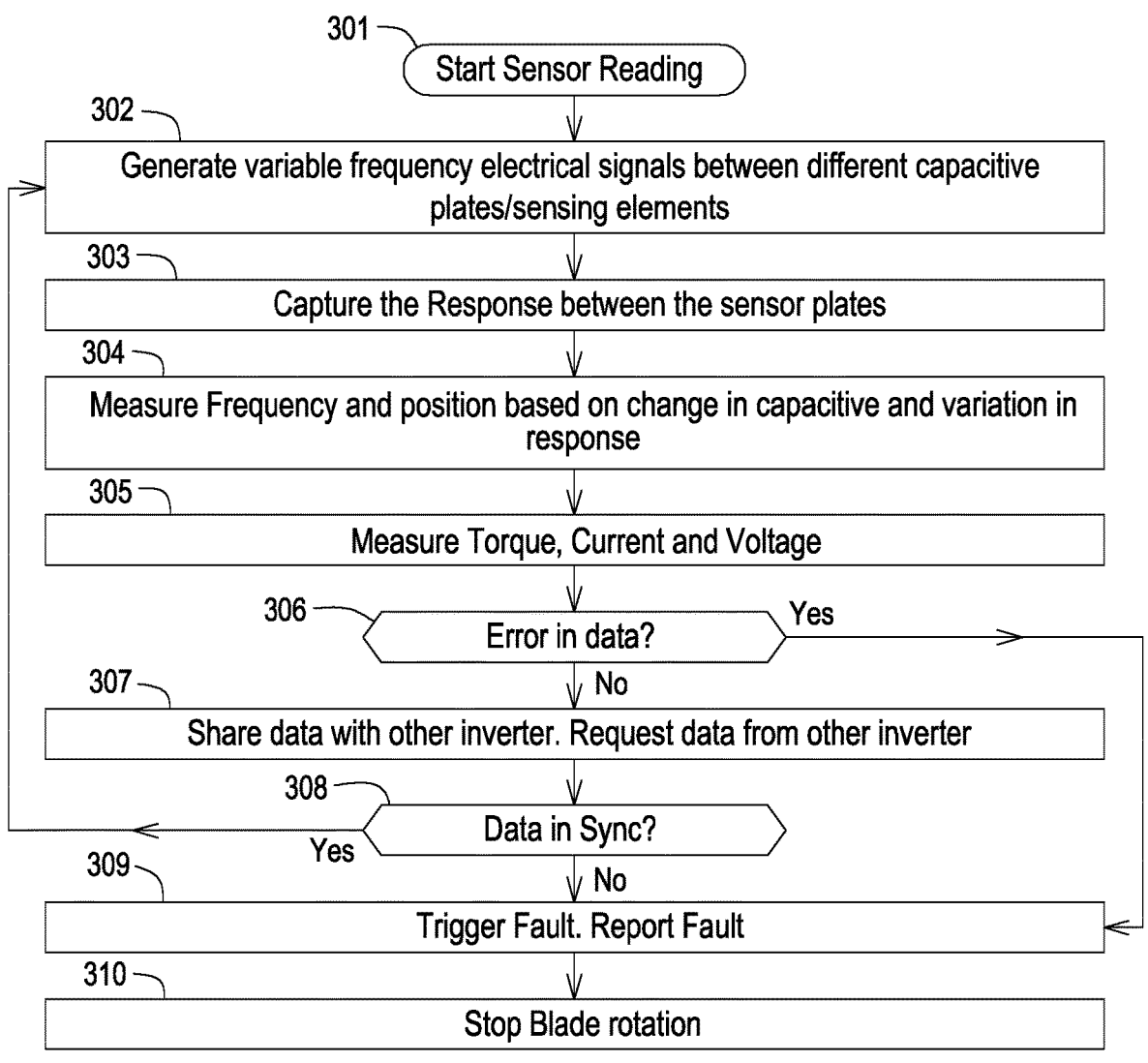

301 — Start Sensor Reading

302 — Generate variable frequency electrical signals between different capacitive plates/sensing elements 303 — Capture the Response between the sensor plates 304 — Measure Frequency and position based on change in capacitive and variation in response 305 — Measure Torque, Current and Voltage 306 — Error in data?    Yes No 307 — Share data with other inverter. Request data from other inverter 308 — Data in Sync?

Yes    No

309 — Trigger Fault. Report Fault

310 — Stop Blade rotation

FIG. 3

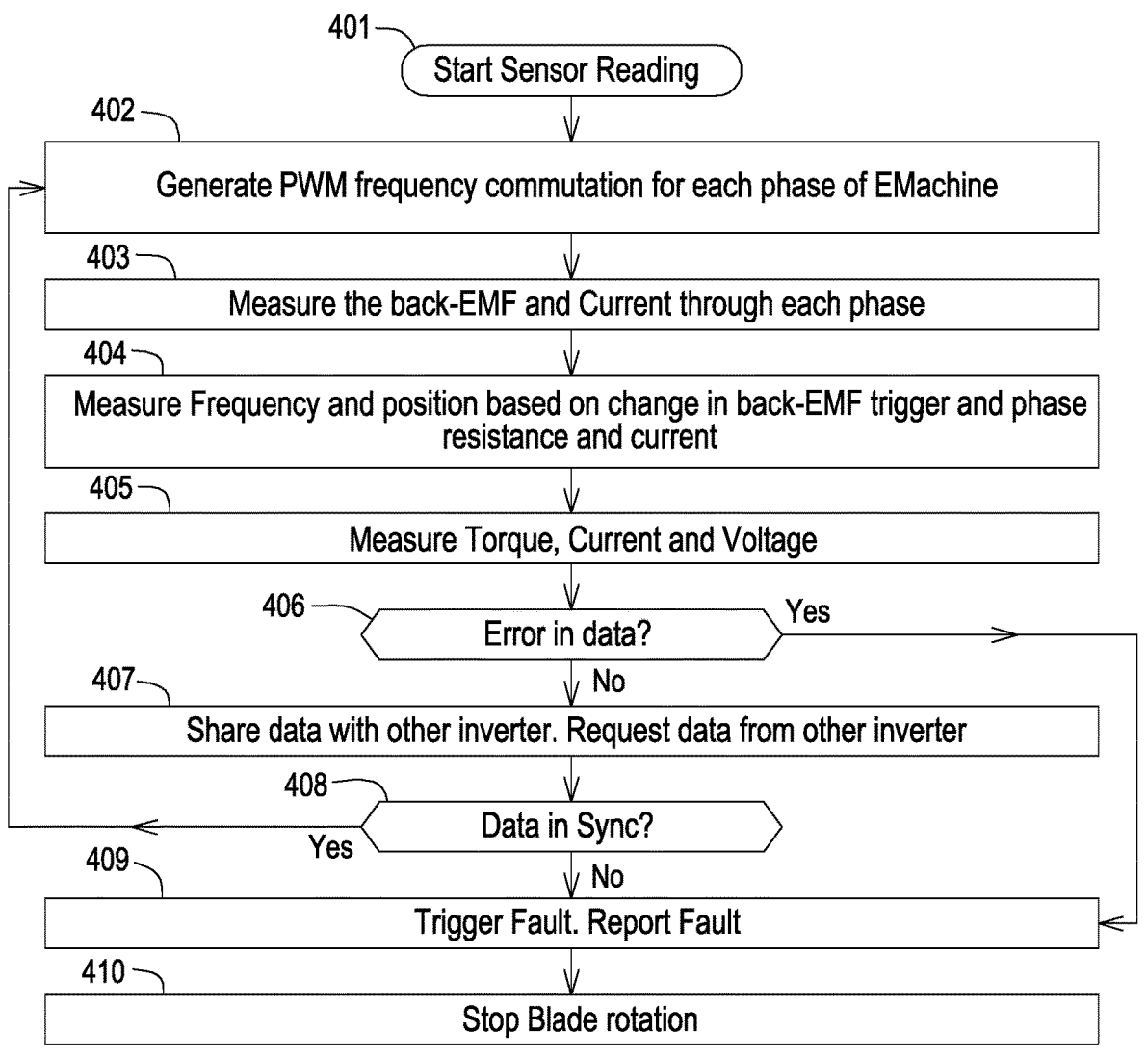

401 — Start Sensor Reading

402 — Generate PWM frequency commutation for each phase of EMachine

403 — Measure the back-EMF and Current through each phase

404 — Measure Frequency and position based on change in back-EMF trigger and phase resistance and current 405 — Measure Torque, Current and Voltage 406 — Error in data? — Yes No 407 — Share data with other inverter. Request data from other inverter 408 — Data in Sync? — Yes No 409 — Trigger Fault. Report Fault 410 — Stop Blade rotation

FIG. 4

ROTARY MOWER BLADE POSITION SYNCHRONIZATION SYSTEM

FIELD OF THE INVENTION

This invention relates to mower decks on grass mowing machines, and specifically to a rotary mower blade position synchronization system.

BACKGROUND OF THE INVENTION

Grass mowing machines with mower decks may have two or more rotary mower blades attached to spindles. To avoid contact between them, the rotary mower blades may be offset from each other, or may have a timing system with a cogged belt or gear. For example, U.S. Pat. Nos. 8,701,377 and 8,539,745 relate to mower decks with cogged belts to synchronize the blade rotation mechanically. U.S. Patent application US20180160622 relates to a mower deck with toothed wheels along with a Hall effect sensor that signals blade position for electronic synchronization of the blade motors. However, Hall effect sensors may have less accuracy because of external magnetic fields or high temperatures. An improved, low cost, rotary mower blade position synchronization system is needed for adverse conditions.

SUMMARY OF THE INVENTION

A rotary mower blade position synchronization system includes a first motor having a position sensor providing position data of the first motor to a first control inverter, and a second motor having a position sensor providing position data of the second motor to a second control inverter. The first control inverter communicates with the second control inverter to synchronize rotation of the first motor and the second motor to keep a specified angle between the first and second rotary mower blades.

BRIEF DESCRIPTION OF THE DRAWINGS

FIG. 2 is a logic diagram of a first embodiment of a rotary mower blade synchronization system using opto-electric or optical sensors.

FIG. 3 is a logic diagram of a second embodiment of a rotary mower blade synchronization system using capacitive sensors.

FIG. 4 it a logic diagram of a third embodiment of a rotary mower blade synchronization system using a sensorless motor control algorithm.

DESCRIPTION OF THE PREFERRED EMBODIMENT

Figure 1:
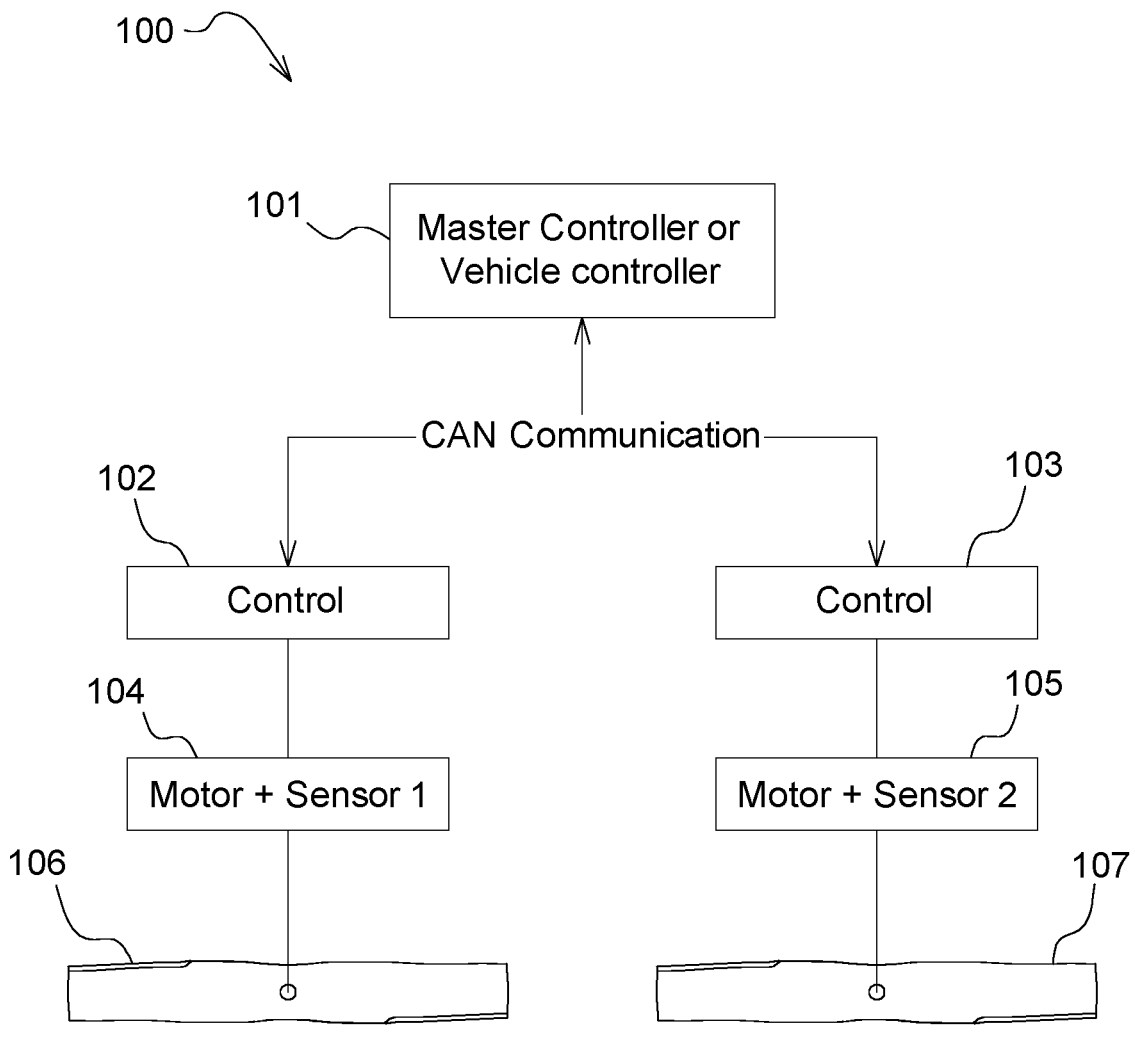
FIG. 1. is a schematic diagram of system component architecture for a rotary mower blade synchronization system according to one embodiment of the invention.

Rotary mower blade position synchronization system 100 may be used on grass mowing machines such as lawn tractors, riding mowers or zero turn mowers. As shown in FIG. 1, in one embodiment, the system may include master controller or vehicle controller 101 with controller area network (CAN) communication to first and second control inverters 102, 103. The control inverters may drive first and second electric motors 104, 105 using switching-element based commutation. The switching element may be a MOSFET, IGBT or silicon carbide switch based on power requirements. Each motor 104, 105 may include a position sensor and may rotate a rotary mower blade 106, 107. Each control inverter may use input from a position sensor to decide the next commutation for driving the motor. This may be a closed loop operation based on data from the position sensors, along with data from the voltage sensors on each control inverter which may accurately estimate speed, angle and stall conditions of each motor. The control inverters may have sensors built in for current and voltage measurement, and may be used to provide actual torque measurement.

In a first embodiment, the rotary mower blade synchronization system may include motors having opto-electric or optical position sensors to sense motor position using the logic steps of FIG. 2. In step 201, sensor reading may start. In step 202, each opto-electric or optical position sensor may generate and transmit pulses or impulse signals towards a rotating element of the motor. For example, the pulses may be square waves converted into light impulses. The pulses or signals may be used to detect the speed and angle of the motor. This may be achieved by sensing the position of gear teeth or other rotating mechanical features that allow passage of light based on movement of the motor. For example, sensing gear teeth or other mechanical features may allow passage of light based on position of the rotor. In step 203, each opto-electric or optical position sensor may capture the response reflected back at the receiver. In step 204, each opto-electric or optical position sensor may measure the frequency and position based on time elapsed and number of position sequences received. In step 205, each control inverter may measure the torque, current and voltage of a motor. In step 206, each control inverter may determine if there is an error in the data. If there is an error, a fault may be triggered and reported in step 209, and blade rotation may be stopped in step 210. If there is not an error, in step 207, each control inverter may share data with the other control inverter, and request data from the other control inverter. In step 208, each control inverter may determine if the data is synchronized. If the data is in sync, each opto-electric or optical sensor position may continue to generate and transmit pulses in step 202. If the data is not in sync, a fault may be triggered and reported in step 209, and blade rotation may be stopped in step 210.

In a second embodiment, the rotary mower blade synchronization system may include motors having capacitive position sensors which may sense the position of each motor using the logic steps shown in FIG. 3. Each capacitive position sensor may be attached near the shaft of an electric motor and may provide an analog signal based on change in capacitance, by area or distance between sensing plates, based on position of the rotor of the electric motor. In step 301, sensor reading may start. In step 302, each capacitive position sensor may generate variable frequency electrical signals between capacitive plates or sensing elements. In step 303, each capacitive position sensor may capture the response between the sensor plates. In step 304, each capacitive position sensor may measure the frequency and position based on change in capacitance and variation in response. Each capacitive position sensor may measure the capacitance value which may be used to estimate speed and position of one of the motors. The capacitive position sensors do not require metallic sensing elements and may have small dimensions that may be combined for ultra-high resolution. In step 305, each control inverter may measure the torque, current and voltage of a motor. In step 306, each control inverter may determine if there is an error in the data. If there is an error, a fault may be triggered and reported in step 309, and blade rotation may be stopped in step 310. If there is not an error, in step 307, each control inverter may share the position data with the other control inverter, and request the position data from the other control inverter. In step 308, each control inverter may determine if the position data is synchronized. If the data is in sync, each capacitive position sensor may continue to generate signals in step 302. If the data is not in sync, a fault may be triggered and reported in step 309, and blade rotation may be stopped in step 310.

In a third embodiment, the rotary mower blade synchronization system may sense the position of each motor with sensorless position and speed detection based on direct measurements by each control inverter, using the steps of FIG. 4. In step 401, measurements may start. In step 402, each control inverter may generate pulse width modulation (PWM) frequency commutation for each phase of the motor. In step 403, each control inverter may measure the back EMF pulses and current passing through each phase. To measure the current, each control inverter may take a sample at the center of the PWM duty cycle to avoid noise in measurement. Center aligned PWM commutation may be used to eliminate harmonics in the system. By detecting the rising and falling edge of back-EMF pulses, accuracy may be increased at lower speeds. In step 404, each control inverter may measure frequency and position based on change in back EMF pulses trigger and phase resistance and current. For example, each control inverter may use an interrupt routine, and may detect zero crossing or set a fixed voltage threshold to avoid noise interference. In step 405, each control inverter may measure torque, current and voltage of the motor. In step 406, the control inverter may determine if there is an error in the data. If there is an error, a fault may be triggered and reported in step 409, and blade rotation may be stopped in step 410. If there is not an error, in step 407, each control inverter may share the position data with the other control inverter, and request the position data from the other control inverter. In step 408, each control inverter may determine if the position data is synchronized. If the data is in sync, each control inverter may continue to generate PWM frequency commutation in step 402. If the data is not in sync, a fault may be triggered and reported in step 409, and blade rotation may be stopped in step 410.

Figure 5:
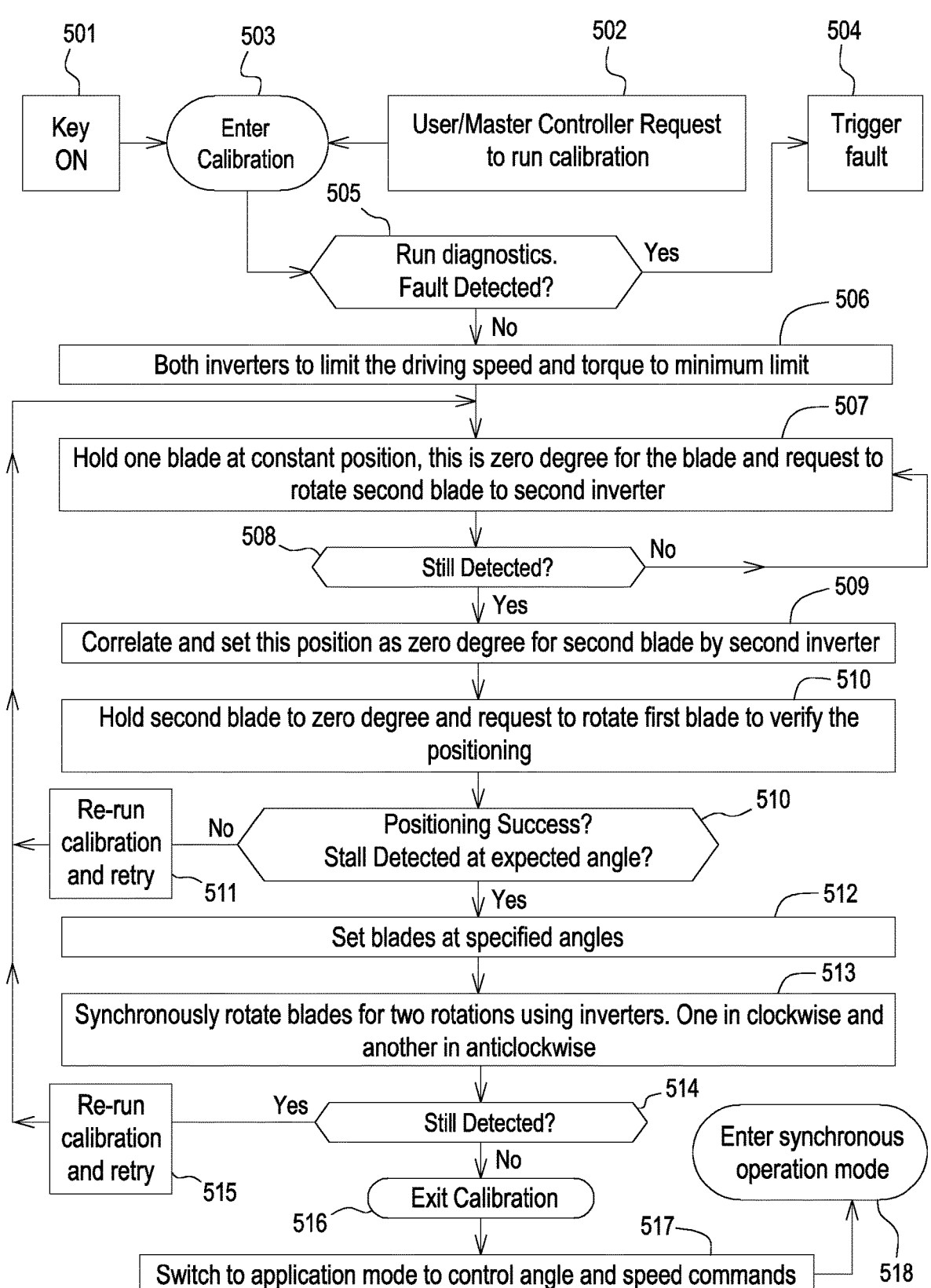
FIG. 5 is a logic diagram of a calibration routine for a rotary mower blade position synchronization system according to one embodiment of the invention.

In one embodiment, the rotary mower blade synchronization system may include a calibration routine for positioning the mower blades. For example, the operator may request calibration after the rotary mower blades are changed or serviced. The calibration routine may take approximately 500 to 1000 milliseconds. As shown in FIG. 5, the calibration routine may be entered in step 503 once the key switch is on in step 501, and the user or master controller requests to run calibration in step 502. In step 505, diagnostics may run to detect faults. If a fault is detected, a fault may be triggered in step 504. If no fault is detected, blade rotation speed and torque may be set at minimum limits in step 506. In step 507, the first control inverter may hold the first blade at a constant position, while the second control inverter rotates the second blade at the low speed and torque. In step 508, the system may determine if a stall is detected. A stall may be detected if the second blade contacts the first blade, resulting in stall torque measured by a sensor. If a stall is detected, the position of the second blade may be set at the stall position which may be assigned as zero degrees in step 509. If a stall is not detected, the second blade may continue to rotate. In step 510, the second blade may be held at the zero degree position while the first blade may be rotated to verify the positioning. In step 511, positioning success may be verified if the first blade stalls after rotating one revolution to the expected angle. If not verified, calibration may be re-run in step 512 by returning to step 507. If the position is verified, the first and second blades may be set at specified angles for mowing operation in step 513. In step 514, the blades may be synchronously rotated using the control inverters, with one blade rotated in the clockwise direction and the other in the counter clockwise direction. In step 515, the system may determine if a stall is detected. If a stall is detected, calibration may be re-run in step 516 by returning the logic to step 507. If a stall is not detected, calibration may be exited in step 517, and the system may switch to application mode to control angle and speed commands in step 518. For example, the system may switch the blade speed and torque back from the minimums to the speed and torque values for the synchronous operation mode.

Figure 6:
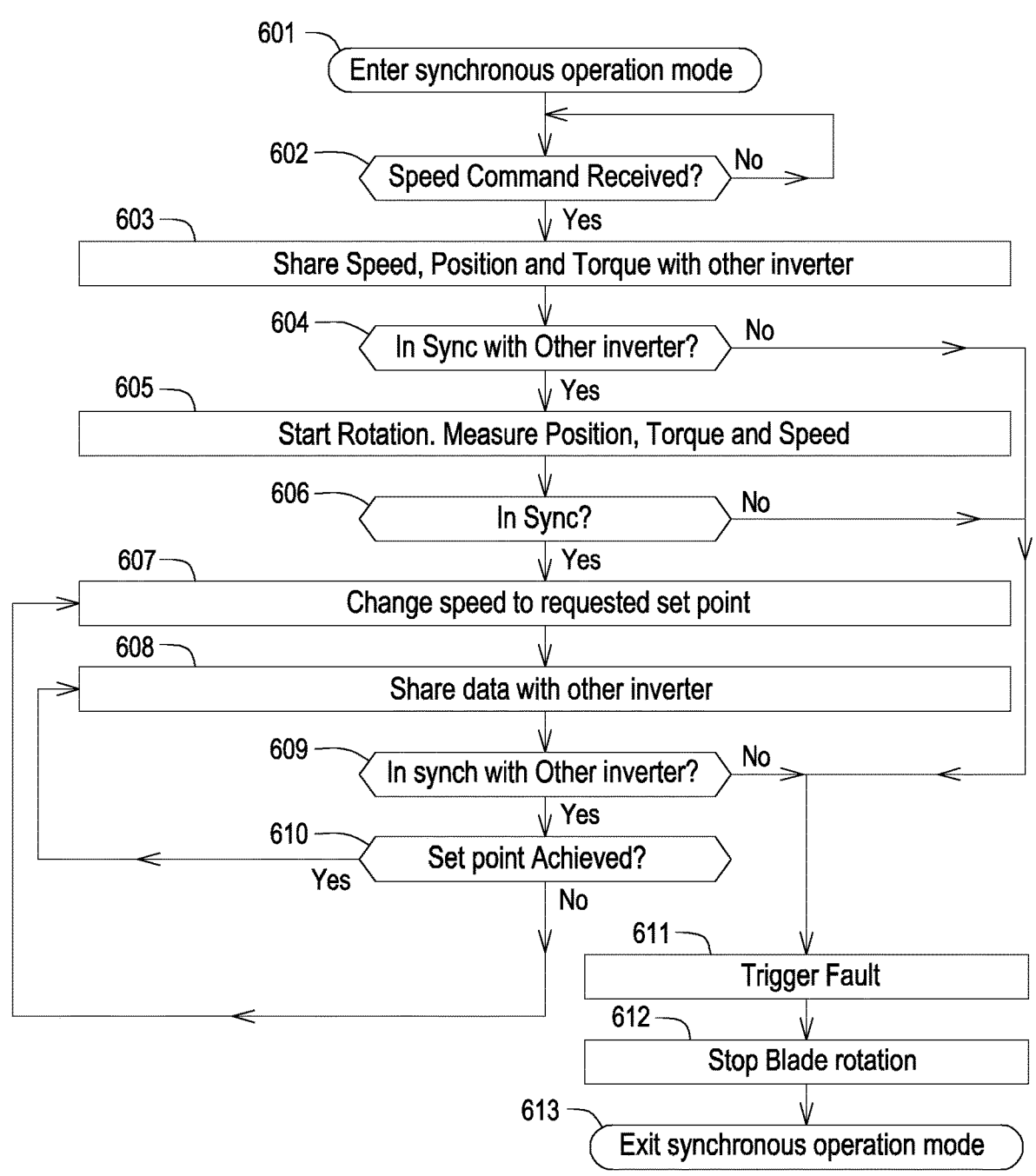
FIG. 6 is a logic diagram of a synchronous operation mode for a rotary mower blade synchronization system according to one embodiment of the invention.

In one embodiment, the rotary mower blade synchronization system may include a synchronous operation mode as shown in FIG. 6. The synchronous operation mode may be used for mowing. The system may enter the synchronous operation mode in step 601, and each control inverter may determine if a speed command is received in step 602. Once a speed command is received, the control inverter may share a speed, position and torque command with the other control inverter in step 603. Each control inverter then may determine if it is in sync with the other control inverter in step 604. If the control inverter is not in sync, a fault may be triggered in step 611, blade rotation may be stopped in step 612, and the synchronous operation mode may be exited in step 613. If the control inverter is in sync, both control inverters may start rotation and measure position, torque and speed in step 605. In step 606, each control inverter may determine if it is in sync with the other control inverter. If it is not in sync, a fault may be triggered in step 611, blade rotation may be stopped in step 612, and the synchronous operation mode may be exited in step 613. If it is in sync, the speed may be changed to a requested set point in step 607. In step 608, each control inverter may share data with the other control inverter. Each control inverter then may determine if it is sync with the other control inverter in step 609. If it is not in sync, a fault may be triggered in step 611, blade rotation may be stopped in step 612, and the synchronous operation mode may be exited in step 613. If it is in sync, the control inverter may determine if a set point for speed is achieved in step 610. If the set point is achieved, the control inverter may continue to share data with the other control inverter in step 608. If the set point is not achieved, the control inverter may return to step 607 to change speed to the requested set point.

In one embodiment, the rotary mower blade synchronization system may include CAN communication and/or EtherCAT and/or Ethernet communication between the control inverters, providing high speed communication of speed, position and torque of the respective motors. During the synchronous operation mode, both inverters may operate to keep the angle between the blades within a tolerable margin and maintain both blades at exactly the same speed. In the synchronous operation mode, both control inverters may share the data of sensory elements and trigger next appropriate commutation to rotate the blades. The grass mowing machine thus may have synchronous operation to provide zero speed variation from the inverter commutation.

In one embodiment, the rotary mower blade synchronization system may have a hysteresis or threshold which may be set to provide tolerable margins between the two bade positions. Each control inverter may work synchronously to minimize the hysteresis or threshold difference. if the speed and/or angle threshold between the blades increases, the control inverters may immediately derate the torque and avoid a collision of blades. The control inverters may stop the blades within a few milliseconds if the threshold between blades is too much. This will trigger a fault, and the user/Master controller may clear the fault after recalibration.

Having described the preferred embodiment, it will become apparent that various modifications can be made without departing from the scope of the invention as defined in the accompanying claims.

The invention claimed is:

1. A rotary mower blade position synchronization system, comprising:
   a first motor rotating a first rotary mower blade and a second motor rotating a second rotary mower blade;
   the first motor having a position sensor providing position data of the first motor to a first control inverter, and the second motor having a position sensor providing position data of the second motor to a second control inverter;
   the first control inverter communicating with the second control inverter to synchronize the rotation of the first motor and the second motor to keep a specified angle between the first rotary mower blade and the second rotary mower blade.

2. The rotary mower blade position synchronization system of claim 1 wherein the first and second position sensors are opto-electric sensors.

3. The rotary mower blade position synchronization system of claim 1 wherein the first and second position sensors are capacitive position sensors.

4. The rotary mower blade position synchronization system of claim 1 wherein the first and second position sensors comprise direct measurement by each control inverter using pulse width modulated commutation.

5. A rotary mower blade position synchronization system, comprising a calibration routine for setting the position of a first rotary mower blade and a second rotary mower blades, having the following steps:
   limiting the driving speed and torque of the first rotary mower blade and the second rotary mower blade to a minimum limit;
   holding the first rotary mower blade in a constant position while rotating the second rotary mower blade;

detecting a stall condition where the second rotary mower blade contacts the first rotary mower blade;
   setting as a zero degree position where the stall condition was detected; and
   setting the first rotary mower blade and the second rotary mower blade at specified angles relative to the zero degree position for synchronous rotation.

6. The rotary mower blade position synchronization system of claim 5 further comprising the step of verifying the zero degree position by holding the second rotary mower blade at the zero degree position while rotating the first rotary mower blade until a stall condition is detected.

7. The rotary mower blade position synchronization system of claim 6 further comprising the step of re-running the calibration routine if the stall condition is not detected at the zero degree position.

8. The rotary mower blade position synchronization system of claim 5 further comprising the step after setting the zero degree position, of synchronously rotating the first rotary mower blade in a clockwise direction and the second rotary mower blade in a counterclockwise direction to determine if a stall is detected.

9. A rotary mower blade position synchronization system, comprising:
   a first rotary mower blade and a second rotary mower blade, each of the first and second mower blades rotated by an electric motor;
   a first position sensor and a second position sensor, the first and second position sensors providing electric motor position signals to a first control inverter and a second control inverter;
   the first control inverter communicating with the second control inverter to run a calibrate routine to set the angle of the first rotary mower blade relative to the second rotary mower blade, and a synchronous operation mode to operate the first and second electric motors at rotational speeds that maintain the position of the first rotary mower blade relative to the second rotary mower blade when mowing.

10. The rotary mower blade position synchronization system of claim 9, wherein the first and second position sensors are optical sensors.

11. The rotary mower blade position synchronization system of claim 9, wherein the first and second position sensors are capacitive sensors.

12. The rotary mower blade position synchronization system of claim 9 wherein the first control inverter communicates with the second control inverter via a CAN bus.

* * * * *